Sept. 24, 1929.          N. A. HALLWOOD          1,729,106
WEIGHT INDICATING MECHANISM FOR SCALES
Filed Feb. 27, 1926
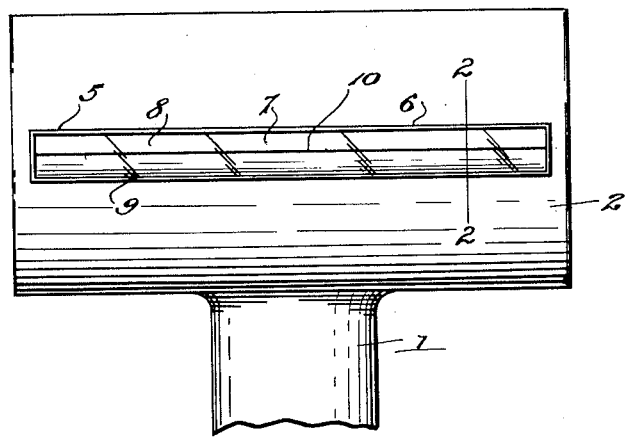
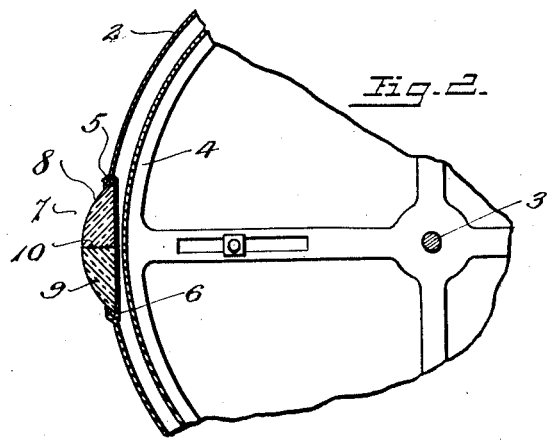
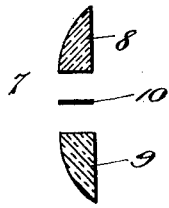
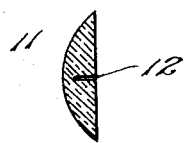
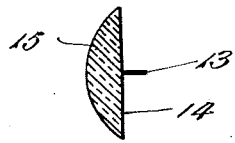
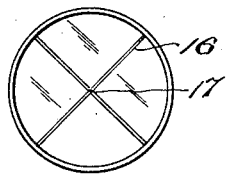
Inventor
Nathan A. Hallwood
By W. S. McDowell
Attorney Patented Sept. 24, 1929

1,729,106

UNITED STATES PATENT OFFICE

NATHAN A. HALLWOOD, OF COLUMBUS, OHIO

WEIGHT-INDICATING MECHANISM FOR SCALES

Application filed February 27, 1926. Serial No. 91,085.

This invention relates broadly to improvements in scales and is addressed particularly to the weight indicating mechanism thereof and has for its primary object to provide in conjunction with the weighing mechanism of a scale an improved lens construction through which weight readings are made and wherein the lens construction is formed to provide means whereby the reader of the scale is compelled to occupy a correct reading position before the weight indicating mechanism can be correctly viewed and read.

Many computing scales now in commercial use include weight indicating mechanisms embodying a rotatable drum arranged for rotation in a closed casing and having the weight graduations provided upon the outer circumferential wall thereof, the casing being provided with a sight opening covered ordinarily by a lens across which extends a fine wire or other fine longitudinal indication constituting a norm or zero indication which furnishes a basis of comparison with the graduations on the indicating drum to denote the deflection of the scale in response to applied weights of varying mass. Practice has disclosed that this customary construction frequently results in an erroneous reading of the scale indicating means, since unless the reader is standing in the horizontal plane of the norm mark a true and accurate comparison and register of the norm with the graduations on the weight drum can not be obtained. For example, a person of short stature looking upwardly at an angle into the reading lens will read the scale differently from a person of tall stature looking downwardly at an angle into the reading lens.

Therefore, in order to obviate this condition and to compel the reader to assume a correct position in reading the scale the lens in front of the drum is provided with a flat ribbon-like norm which when viewed in edge elevation is very thin and offers no appreciable obstruction in the reading of the drum, but when the scale is read from an angle from either above or below the horizontal plane of the ribbon-like norm, the latter presents an opaque surface of appreciable width which obscures the surface of the drum and prevents an attempted reading thereof with any degree of accuracy in mind, compelling the reader to assume a correct position so as to bring the norm into true edge elevation, in which position correct readings are obtainable in the ordinary manner.

With these and other objects in view, as will appear as the description proceeds, the invention consists in the novel features of construction, combinations of elements and arrangements of parts hereinafter to be fully described and pointed out in the appended claims.

In the accompanying drawing:

Figure 1 is a front elevation of the weight indicating tower of the scale, the latter being provided with a reading lens formed in accordance with the present invention, Figure 2 is a vertical sectional view on the line 2—2 of Figure 1,

Figure 3 is a sectional view disclosing the lens as constructed in accordance with the preferred form of the invention, and Figures 4, 5 and 6 are similar views showing modified forms of the invention.

Referring more particularly to the drawings the numeral 1 designates the upper portion of the tower of an ordinary commercial type of scale, wherein the tower is formed to provide a substantially cylindrical casing 2 having mounted for rotation therein about a longitudinally extending shaft 3, a rotatable drum 4, the outer circumferential wall of the drum being provided with the customary weight graduations or with other computing indicia. It will be understood the drum 4 is adapted to be revolved from a normal position about the axis of the shaft 3 by any suitable mechanism customary in scales of this type, and since this mechanism does not specifically enter into the present invention, the same has been omitted.

The casing 2 is provided in this instance with a longitudinally extending slot 5 in which is mounted a rectangular frame 6 carrying a lens 7 formed in accordance with the present invention. As shown, in its preferred form, the lens consists of upper and lower sections 8 and 9 respectively which, when combined and mounted in the frame 6 provide a convex outer surface and a plane vertical inner surface, producing the customary plano-convex construction. By forming the lens in two sections I am enabled to place between the same a reading norm 10 in the form of a flat relatively wide ribbon possessing opaque properties, and this ribbon may be either cemented to the adjoining surface of the sections 8 and 9 or merely frictionally held therebetween by the action of the frame 6. Again, similar results can be obtained by uniting the sections 8 and 9 through the medium of an opaque cement or other opaque surfacing material.

By the employment of this construction it will be observed that the reader of the scale, in order to obtain accurate results, must stand so that the eye is in the horizontal plane of the norm 10 to permit the latter to be viewed in true edge elevation. When read in this manner the norm, because of its very thin body presents nothing more than a line to the vision, which permits of the clear reading of the graduations on the outer surface of the drum 4 throughout substantially the full width of the lens 7. However, if the reader of the scale should occupy a position looking angularly downwardly or upwardly from points above or below the plane of the norm 10, the latter will be viewed partially in plan, whereby its thickness or width is observable, and this prevents the desired unobstructed view of the indicating drum, and compels the reader to readjust his position so as to view the indicating mechanism properly. By this arrangement an error of very considerable importance in scale reading is overcome.

The same arrangement is capable of being carried out as shown in Figures 4 and 5. In Figure 4 a lens 11 is illustrated which is longitudinally scored or grooved as at 12 in a horizontal plane for some considerable depth, but not sufficient to separate the lens into two separate sections. Also, in Figure 5 the norm 13 is arranged immediately adjacent to the plane side 14 of the lens 15, avoiding the cutting or scoring of the latter as shown in Figures 3 and 4.

In Figure 6 a circular lens is disclosed consisting of united quarter sections wherein the meeting edges thereof are provided with intersecting reading indications 16, the point of intersection thereof constituting the reading norm.

What is claimed is:

1. In a scale, having an indicator presented for reading, a lens positioned in front of said indicator having a convex outer surface and a flat inner surface, said lens being divided into upper and lower sections having plane horizontal meeting surfaces extending longitudinally of the lens, said meeting surfaces being provided with opaque layer-forming means.

2. In an instrument of the class described including an indicator, a lens in front of said indicator and positioned in close proximity to the latter, said lens being formed to include an outer convex and an inner flat surface and being divided centrally and longitudinally thereof into a pair of sections having horizontal adjoining surfaces, said adjoining surfaces being provided with opaque layer-forming means between said sections.

3. A lens structure comprising a plano-convex body formed to include a pair of duplicate sections having their front walls registering to form a convexed outer surface, vertical rear walls and adjoining horizontally disposed meeting walls, and a thin flat ribbon of opaque material interposed between the meeting walls, and covering the full area thereof.

4. A lens structure comprising a plano-convex body formed to include a pair of duplicate sections having their front walls registering to form a convexed outer surface, vertical rear walls and adjoining horizontally disposed walls, and a thin body of opaque material interposed between the horizontal walls.

In testimony whereof I affix my signature.

NATHAN A. HALLWOOD.